Patented Jan. 8, 1929.

1,697,845

UNITED STATES PATENT OFFICE.

JOHN HERBERT ADAMS, OF CHICAGO, ILLINOIS, ASSIGNOR TO WESTERN ELECTRIC COMPANY, INCORPORATED, OF NEW YORK, N. Y., A CORPORATION OF NEW YORK.

SOLDERING MATERIAL.

No Drawing.   Application filed January 10, 1923.   Serial No. 611,849.

This invention relates to soldering materials, and more particularly to soldering materials for soldering coated metallic surfaces.

The use of a flux, such as rosin, which is either combined with a soldering material or separate therefrom, for preparing metallic surfaces to be joined by solder is well known, and when such surfaces have some protective coating such as baked enamel or paint it has been necessary to first remove such coating before applying the flux to the surface.

One object of this invention is to provide material for removing a coating from a metallic surface while a soldering flux is being applied thereto.

Another object of the invention is to provide an improved solder containing a material adapted to remove a coating from a metallic surface and to flux or otherwise prepare the surface for the reception of the solder.

In order to accomplish these objects, a solvent for coating materials is combined with the fluxing material, the combination then being employed either separately or as a core for the solder.

In one embodiment of the invention naphthalene is combined with rosin to form a solid compound which may be used in advance for removing the coating from and otherwise preparing the metallic surface for the application of the solder. It is desirable to employ as large a proportion of naphthalene as possible, a mixture consisting of one third of naphthalene and two thirds of rosin having been found to be satisfactory.

The effectiveness of naphthalene and other similar materials as solvents of solids is materially increased by the temperatures usually encountered in soldering. Therefore the mixture including any of them and the usual rosin flux may be employed as the core for a self-fluxing solder. Thus when the flux-cored solder is applied to the coated metallic surface and heated by the usual soldering iron, the coating is removed, the surface is cleaned, and the solder is applied in one operation.

By employing either the separate compound or the solid removing and fluxing solder, the preliminary operation of removing the enamel or other protective coating from the surface is entirely eliminated.

In the manufacture of the solder the soldering compound may be wrapped around or extruded over the core comprising the rosin and the solvent in a manner similar to that employed in the manufacture of the usual rosin-cored solder.

Although naphthalene is mentioned in the specific embodiment of this invention, it is to be understood that various other solvents, such as anthracene and beta naphthol, may be employed instead of naphthalene, and that the invention is to be limited only by the scope of the appended claim.

What is claimed is:

A new article of manufacture, comprising an enamel-removing flux core consisting solely of 1 part naphthalene and 2 parts rosin, covered by an extruded soldering material.

In witness whereof, I hereunto subscribe my name this 27th day of December, A. D. 1922.

JOHN HERBERT ADAMS.